United States Patent [19]

Ensor et al.

[11] Patent Number: 5,550,900

[45] Date of Patent: Aug. 27, 1996

[54] APPARATUS AND METHOD FOR ROUTING MESSAGES IN A TELEPHONE MESSAGE CENTER

[75] Inventors: Myra L. Ensor, Summit; Anthony J. Grewe, Holmdel; Howard M. Singer, Marlboro, all of N.J.

[73] Assignee: Lucent Technologies Inc., Murray Hill, N.J.

[21] Appl. No.: 366,948

[22] Filed: Dec. 29, 1994

[51] Int. Cl.⁶ ............................................. H04M 11/00
[52] U.S. Cl. .................... 379/67; 379/74; 379/77; 379/87; 379/142; 370/71
[58] Field of Search .............................. 379/74, 77, 87, 379/142, 67, 88; 370/71

[56] References Cited

U.S. PATENT DOCUMENTS

| | | | |
|---|---|---|---|
| 4,277,649 | 7/1981 | Sheinbein | 379/201 |
| 4,578,540 | 3/1986 | Borg et al. | 379/50 |
| 4,807,225 | 2/1989 | Fitch | 370/71 |
| 4,807,275 | 2/1989 | Enstrom | 379/68 |
| 4,847,889 | 7/1989 | Eswaran | 379/67 |
| 4,951,307 | 8/1990 | Willard | 379/74 |
| 4,985,913 | 1/1991 | Shalom et al. | 379/76 |
| 5,121,422 | 6/1992 | Kudo | 379/73 |
| 5,339,354 | 8/1994 | Becker et al. | 379/67 |
| 5,392,332 | 2/1995 | Core et al. | 379/67 |
| 5,394,445 | 2/1995 | Ball et al. | 379/67 |
| 5,400,393 | 3/1995 | Knuth et al. | 379/88 |
| 5,432,844 | 6/1995 | Core et al. | 379/67 |

*Primary Examiner*—Jeffery Hofsass
*Assistant Examiner*—Daniel S. Hunter
*Attorney, Agent, or Firm*—Samuel R. Williamson

[57] ABSTRACT

A telephone message system overcomes the problems and limitations of presently available systems that seek to enhance inter-and intra-premises communications. The system comprises a controller unit with Caller ID capabilities and one or more adjunct units that are all bridged onto a single wire-pair at a user's residential location in a parallel electrical connection. For facilitating a message routing capability, a mailbox of groups of telephone numbers are associated with a particular party at the residence. These telephone numbers are preprogrammed into the controller unit so that upon receipt of an incoming call from one of these telephone numbers, identified through caller ID, the incoming call is associated with the particular called party and the controller unit routes the incoming call directly to the called party's mail box where the calling party is able to leave a message. A user may easily access received messages stored in his or her mailbox in the message system which may be configured as either open or restricted. If the message system is open, then a user may access not only messages in his or her mailbox but also access messages in any of other mailboxes also in the system. If the message system is restricted, however, then a user is allowed access only to messages in his or her mailbox.

28 Claims, 5 Drawing Sheets

APPARATUS AND METHOD FOR ROUTING MESSAGES IN A TELEPHONE MESSAGE CENTER

BACKGROUND OF THE INVENTION

1. Technical Field

This invention relates to telephone message systems and, more particularly, to a telephone message system which includes standard telephone equipment.

2. Description of the Prior Art

Various improvements have been made in residential telephone equipment by adding certain features and services. One such service is Caller ID wherein the identity of a calling party is made available to a called party prior to the called party answering an incoming telephone call. This advantageously allows a called party the option of screening calls and only answering those that he or she recognizes and chooses to answer. The Caller ID feature is described more comprehensively in U.S. Pat. No. 4,277,649.

Other improvements in residential telephone equipment include such features and services as: an intercom system for paging and monitoring; a facsimile machine and a computer for sending and receiving images and data, by way of example. Since one cannot expect to find more than a single wire-pair at any given location, it is frequently necessary to supply additional wiring beyond the single wire-pair used for basic telephone service in order to increase the number of communication channels. Costs associated with adding or relocating wires can be significant, however. Furthermore, many commercially available systems that are used to increase information distribution capacity are incompatible with existing telephone equipment, so a user's investment is immediately eroded.

From a convenience standpoint, it is desirable for a customer to merely purchase a telephone product, take it home, and plug it into an existing telephone jack. Many systems that utilize the local telephone wire-pair at a user's premises require that a master station be placed in a series connection with the incoming wire-pair from the telephone central office. Series connections require that internal wiring be modified which usually means that a telephone installer or an electrician needs to be hired. Series connections also have the drawback that the master station cannot be located at any telephone jack. Since the master station terminates the incoming wire-pair, it is typically located at the protector block or the telephone jack nearest to it. Relocating a master station presents difficulties because the connection must be electrically maintained at one point while the station is physically moved to another. Finally, even when the master station is compatible with existing telephone sets, should the master malfunction, series connected equipment is likely to malfunction as well.

It is therefore desirable to provide improved functions and features in telephone equipment for use at residential premises, yet have such equipment be compatible with and operate along with existing telephone extensions on a common wire-pair.

SUMMARY OF THE INVENTION

The telephone message system of the present invention overcomes the problems and limitations of commercially available systems that seek to enhance inter-and intra-premises communications. The system comprises a controller unit with Caller ID capabilities and one or more adjunct units that are bridged onto a single wire-pair at a user's residential location in a parallel electrical connection. These customer installable units are merely plugged into any telephone jack and share a telephone wire-pair with existing telephone extensions without interference.

In accordance with a first aspect of the invention, a mailbox of groups of telephone numbers is associated with a particular party at the residence. These telephone numbers are preprogrammed into the controller unit so that, upon receipt of an incoming call, one of these telephone numbers, identified through Caller ID, is associated with the particular called party. If a called party is unavailable, for example, the controller unit is configured with information as to the status of the called party and the controller unit routes the incoming call directly to the called party's mailbox where the calling party is able to leave a message. The controller unit also may be configured to generate a specific outgoing message to the calling party previously recorded by the unavailable called party associated with the reached mailbox.

In accordance with a second aspect of the invention, a user may access received messages stored in his or her mailbox. The message system may be either open or restricted. If the message system is open, then a user may access not only messages in his or her mailbox but also access messages in any of other mailboxes also in the system. If the message system is restricted, however, then a user is allowed access only to messages in his or her mailbox.

BRIEF DESCRIPTION OF THE DRAWING

The invention and its mode of operation will be more clearly understood from the following detailed description when read with the appended drawing in which.

Throughout the drawing, the same element when shown in more than one figure is designated by the same reference numeral.

DETAILED DESCRIPTION

Figure 1:
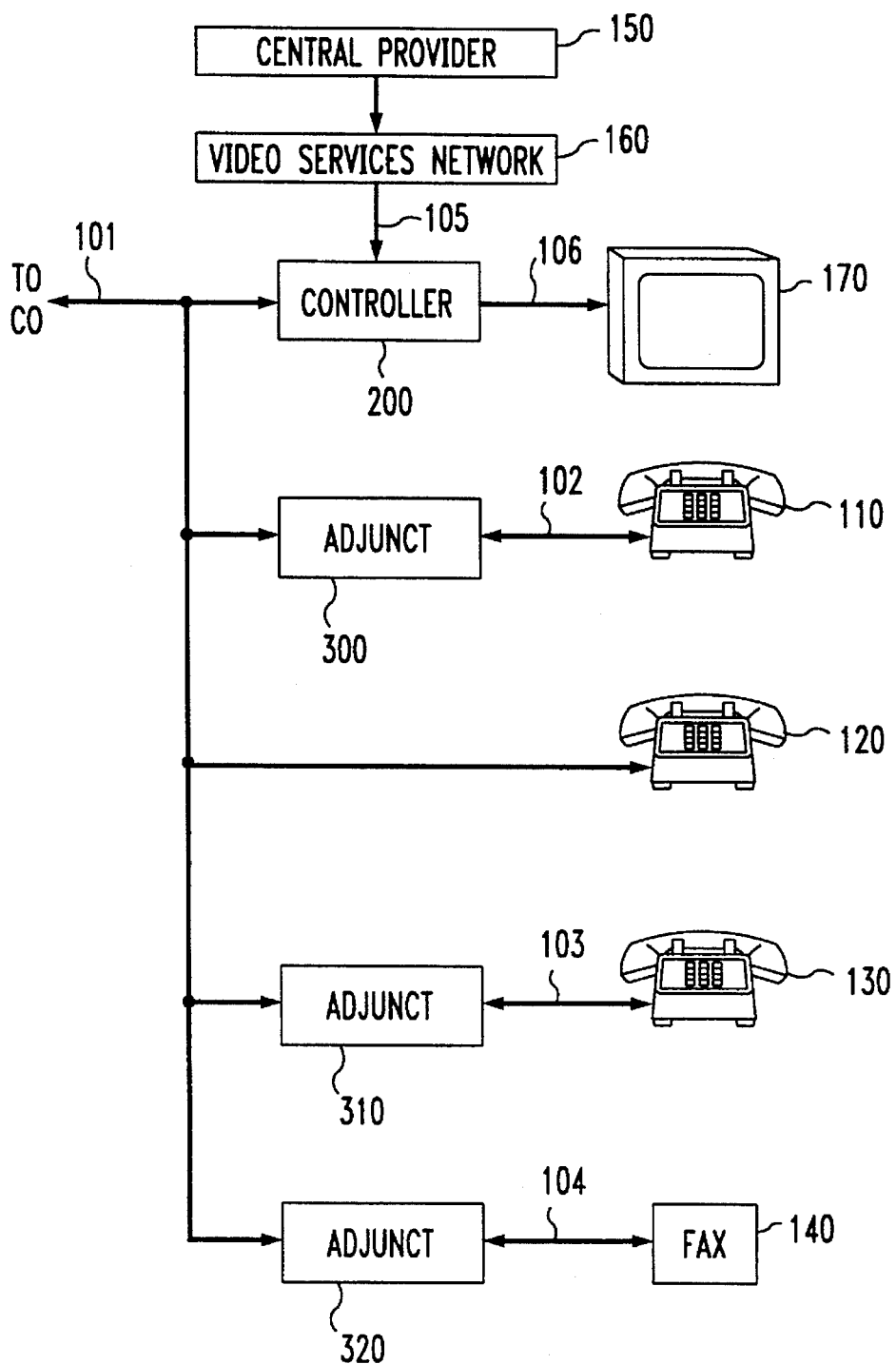
FIG. 1 is a functional block representation of a telephone message system operative in accordance with the principles of the present invention.

Referring now to FIG. 1, there is shown a telephone message center including a controller unit 200 and adjunct units 300, 310 and 320, all commonly connected to a single wire-pair, tip-ring line 101, which, in turn, connects to a switch such as a central office (CO). Both the controller unit 200 and the adjunct units 300 through 320 are customer installable units that are merely plugged into any telephone jack and share the telephone wire-pair with existing telephone extensions without interference. Although only three adjunct units are shown and described herein, it is to be understood that a greater or fewer number of adjunct units may be employed in practicing the principles of this invention.

In accordance with the disclosed embodiment, each of the adjunct units 300 through 320 may communicate with the controller unit 200 over a data channel provided above the standard voice channel on the single wire-pair, i.e., tip-ring line 101. Voice signals are also multiplexed and demultiplexed respectively over designated transmit and receive radio frequency channels, also on the same single wire-pair. Features such as intercom, calling party announcements and message retrievals are provided over these channels, thereby providing a second voice channel for the telephone message system.

Also in accordance with the disclosed embodiment, each of the adjunct units 300 through 320 may independently communicate with each other as well as the controller unit, as described in detail later herein.

Also shown in FIG. 1, for illustrating the environment in which the telephone message center may operate, are a central provider 150, a video services network 160 and a video receiving device 170. The central provider of video services may be a broadcast television station, cable television headend, satellite earth station, closed-circuit video theater, computer network or any other video system or device for transmitting a video program to the display device 170 over the network 160. The display device 170 may be a television, personal computer, work station, broadcast receiving system or other type of device for displaying video signals.

While providing a video display, the display device 170 is arranged to receive information from the controller 200 in response to incoming Caller ID information received over the tip-ring line 10 1. By way of example, when a ring signal representative of an incoming telephone call is received over the tip-ring line 101, to which the controller unit 200 is connected, controller 200 is able to display on the video receiving device 170, attached via coaxial connector 106, a captioned video message which provides the identity of the calling party. Such operation is achieved by incorporating the teaching of U.S. Pat. No. 4,277,649 issued to D. Sheinbein on Jul. 7, 1981 into circuitry in the controller unit 200 that emulates a set-top box. U.S. Pat. No. 4,277,649 discloses circuitry which provides for capturing the identity of the calling party's line and is incorporated herein by reference. Thus, the number of the calling party may be displayed, by way of example, in a captioned manner on the video receiving device 170 while the telephone is ringing, thereby permitting call screening for a user. Alternatively, a user may view a list of telephone numbers of called parties who have left messages on an answering machine described later herein as part of controller 200. Further, a user may program call screening circuitry of the controller 200 such that a name or other identifying information is automatically associated with the identified incoming calling party's line, and this name or related information is displayed in captioned form on the video receiving device along with or in place of the telephone number. Still further, a user may easily program the operation of the controller 200 so that, upon receipt of the incoming ringing signal from the telephone network, the controller 200 attenuates any sound being generated by an audio section associated with the video receiving device, to assist the user in hearing the incoming ringing signal.

Some type of telephone station or telephone device optionally may be associated with each adjunct unit. For example, respectively associated with adjunct units 300 and 310 are telephone stations 110 and 130 Telephone station 110 connects to adjunct unit 300 over line 102 and telephone station 130 connects to adjunct unit 310 over line 103. Alternatively, the adjunct units may be configured as standalone units which provide a range of features from basic, i.e., message waiting light, to complex, i.e., speakerphone display and keypad. Telephone stations 110 and 130 may be existing stations which are unplugged from wall jacks in the premises and plugged instead into existing jacks provided on the adjunct units. An adjunct unit also may be associated with a facsimile machine or computer terminal as illustrated by adjunct 320 and facsimile machine (FAX) 140 connected to adjunct unit 320 over line 104.

In that the adjunct units may be located in different geographical locations at a premises, selective calling or paging for a party may be achieved in accordance with the invention. Since the controller unit may selectively communicate with each one of the adjunct units in response to receiving an incoming Caller ID number, the controller unit may selectively actuate a specific adjunct unit if the called party is most likely attempting to reach a person at the location served by a particular telephone station associated with a specific adjunct unit. Alternatively, the controller unit may distinctively page a particular party at all of the adjunct units.

A mailbox of groups of telephone numbers is associated with either an adjunct at a specific geographical location in the residence, a particular party at the residence, or both. These telephone numbers are preprogrammed into a control unit 240 (FIG. 2) so that upon receipt of an incoming call, a telephone number identified through caller ID is associated with one or more of the adjunct units or the particular called party. Thus, when a ringing signal representative of an incoming telephone call is received over the tip-ring line 101, the controller unit 200 may be configured to provide certain selectable functions if the Caller ID information associated with the incoming call is one that is in memory as part of one of a group of telephone numbers.

The controller 200 is able to transmit the Caller ID information to the specified adjunct unit and have its ringer alert the user. All other adjunct units not programmed to receive this call will not have their ringers actuated. Alternatively, the controller 200 is able to complete a path for the tip-ring line 101 through a specific adjunct so that the ringer of a telephone station connected thereto is actuated. In this instance, the party at the telephone station can answer the call in a normal manner. Still further, once the Caller ID information is available, the controller 200 is able to associate a name or other identifying information with the incoming caller ID information. This name or other identifying information may be generated as speech through a speakerphone contained in an appropriate adjunct unit or, in the case of a page for a particular called party, all of the adjunct units. Such identifying information could be the name of the calling party or, alternatively, the name of the called party.

If a called party is unavailable, once the controller unit 200 is programmed with the information as to the unavailability of the called party, the controller unit can route the incoming call directly to the called party's mailbox which typically is an answering machine located either in the controller unit 200 or connected to an adjunct unit, which is accessed by the controller unit. The controller unit 200 is also able to generate an outgoing message to the calling party previously recorded by the unavailable called party associated with the reached mailbox.

In further illuminating of the inventive arrangement of the telephone message center, this message center shares the telephone wire-pair with telephone extensions already present on the wire-pair, such as illustrated by telephone station 120. These telephone stations operate in a normal manner providing conventional call origination and call answer capabilities. Moreover, these telephone stations respond to ringing signals appearing on the tip-ring line 101 and are completely unaffected in their operation by the telephone message system units also present on this line.

One further feature in this telephone message center is the ability for a user to access messages stored in his or her mailbox. As earlier indicated, this mailbox may be an answering machine either located in the controller unit or connected to an adjunct unit. Certain predetermined codes are enterable at a telephone station connected to an adjunct unit for interrogating the telephone message system. If the message system is open or unrestricted, then anyone may access all of the messages in any of the mailboxes. For example, in an open message system, by entering a code such as #9 which identifies a particular mailbox, a user is immediately allowed access to the contents of a mailbox. Thus, by entering code #9 at the telephone station connected to an adjunct unit, a user is immediately provided with the number of messages stored in his or her mailbox. And when the code * 1 is entered, for example, any messages then stored in the mailbox of the user are played. The *1 code or #9 code is received in the adjunct unit and transmitted to the controller unit which then plays the message.

If the message system is not open or unrestricted, then a user is allowed access only to his or her mailbox and not to the mailbox of others at the premises. Such security is achieved by requiring that each mailbox holder enter an access code, typically three digits, before being allowed to access the messages stored in his or her mailbox. Thus, a user desiring access to his or her mailbox in a restricted telephone message system must, in addition to initially entering a code such as #9, enter a specific access code that only he or she knows. Such access code is easily entered into the message system at the same time the group of telephone numbers for a mailbox is entered. Once the access code is entered, this mailbox in the system is opened and the operation of the system then parallels that of the open system.

Although the answering machine containing the mailboxes is described and shown herein as a part of the controller unit (FIG. 2), it is understood that this answering machine also could be a stand-alone unit which is also connected to, for example, a first adjunct unit that is interrogated by a telephone station connected to a second adjunct unit. In such an arrangement, the message is received in the second adjunct unit, which has the telephone station requesting such service connected thereto, and transmitted to the controller unit where it is retransmitted to the first adjunct which has the answering machine connected thereto. The first adjunct unit then configures the answering machine to play any messages then stored therein in a user's mailbox. Advantageously, none of these signals are transmitted to the central office but, rather, appear on the tip-ring line 101 at radio frequencies substantially above the voiceband used in communicating with the central office.

In accordance with yet another feature in the telephone message center, the adjunct units are equipped with message lights. Whenever a message is stored in the answering machine, a message light on each adjunct unit is illuminated so that a person is able to determine by glancing at any adjunct unit anywhere in the premises that a message has been received and stored in the answering machine.

Any capability that is present in the telephone message center may be accessed from any of the adjunct units or telephone stations connected to these adjunct units. By way of example, if a feature such as voice recognition is available in the controller unit of the telephone message center, the controller unit may then operate as the voice server for any telephone station in the house. Thus, if a user's desires to make a telephone call just using the voice recognition features of the message center, he or she simply picks up a telephone handset unit, or goes off-hook at a speakerphone, and utters the name of the person that he or she then wishes to call. The controller unit, having been preprogrammed or trained such that this name is associated with a number to be dialed, then accesses the tip-ring line 101 and dials the number.

In accordance with still yet another feature in the telephone message center, the operation of the telephone message center is such that it includes the ability to configure the controller unit 200 and the adjunct units so that an incoming call, say late at night, which is not recognized by the controller unit, will not be forwarded through the adjunct units to the telephone stations in the bedrooms. This feature thereby allows a person having this telephone message system to selectively forward and receive calls as desired.

Figure 2:
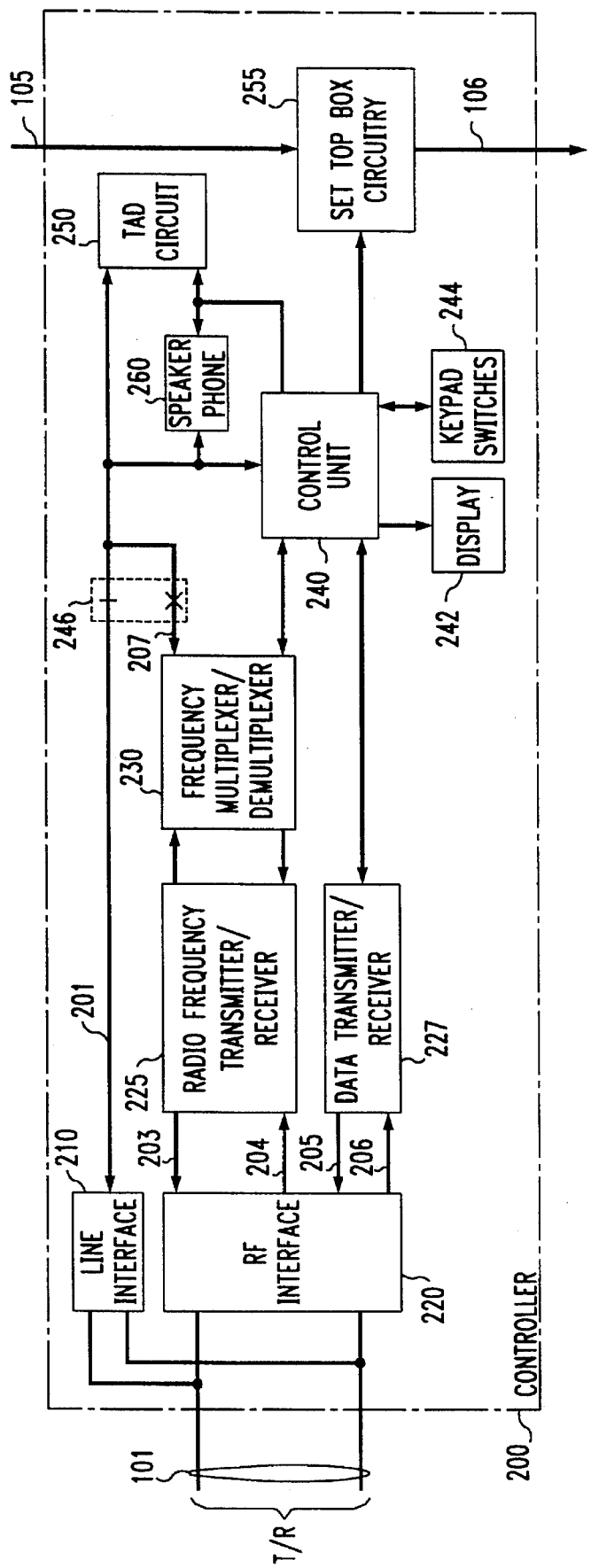
FIG. 2 is a block diagram of the controller unit for a telephone message system, according to the invention.

Referring next to FIG. 2, there is shown a block diagram of controller 200 which controls the plurality of adjunct units 300 through 320 and achieves the above-described features and functions. As indicated earlier herein, this controller unit 200 plugs into any available wall telephone jack and shares the intrapremises telephone wire-pair (tip-ring line 101 ) with existing telephone stations without interference. The tip-ring line 101 connects to the controller unit 200 via a line interface circuit 210 and a radio frequency (RF) interface circuit 220. Line interface circuit 210 includes a ring detect circuit (not shown) which is responsive to incoming ring signals and supplies an indication of these signals to a control unit 240. Line interface circuits including ringing detectors are well-known in the art. A line interface circuit suitable for use as circuit 210 is disclosed in U.S. Pat. No. 4,807,225. The control unit 240 advantageously provides a number of control functions and may be implemented through the use of a microcomputer containing read-only memory (ROM), random-access-memory (RAM) and through use of proper coding. Such a microcomputer is known in the art and is readily available from semiconductor manufacturers such as Motorola, NEC Signetics, Intel and AMD. For example, a microcomputer available from Motorola as part number 6805C4 is usable as control unit 240 with the proper programming.

From line interface circuit 210, the tip-ring signals are coupled over line 201 through a switch 246 to the control unit 240 and also to both the telephone answering device (TAD) circuit 250 and a speakerphone 260. The state of switch 246 is controlled by control unit 240. Circuitry suitable for use in TAD circuit 250 is commercially available from AT&T in a digital answering system, Model 1343. Circuitry suitable for use in speakerphone 260 is commercially available from AT&T as speakerphone Model S201. This speakerphone circuitry is also suitably described in U.S. Pat. Nos. 4,887,288, 4,901,346 and 4,959,887. Switch 246 is shown in its normal "make" state, thus connecting voiceband signals between the line interface circuit 210 and, collectively, the control unit 240, the TAD circuit 250 and the speakerphone 260. Activation of either the TAD circuit 250 or the speakerphone 260 is controlled by the control unit 240.

The RF interface circuit 220 performs the functions of a hybrid circuit at radio frequencies whereby transmit and receive RF signals are transferred to and from the tip-ring line 101. The RF interface 220 receives signals from a radio frequency transmitter portion of the radio frequency transmitter/receiver 225 over line 203 and from data transmitter/receiver 227 over line 205. The RF interface 220 also provides RF signals from the tip-ting line 101 to a radio frequency receiver portion of the radio frequency transmitter/receiver 225 over line 204 and also to data transmitter/receiver 227 over line 206. An RF interface suitable for use herein as RF interface circuit 220 is disclosed in U.S. Pat. No. 4,807,225, this patent being incorporated herein by reference.

Signals received from RF interface circuit 220 and voiceband or audio signals originating at either the TAD circuit 250, the speakerphone 260 or the control unit 240 are coupled through the radio frequency transmitter/receiver 225 and also a frequency multiplexer/demultiplexer 230. This frequency multiplexer/demultiplexer 230 creates additional transmit and receive communications channels at RF frequencies that do not interfere with the audio signals appearing on the tip-ring line 101. Thus, the multiplexer/demultiplexer 230 takes signals in the audio frequency range from the TAD circuit and the speakerphone 260, or synthesized speech generated in the control unit 240 and multiplexes this audio signal to a higher frequency range where it is then transmitted by the radio frequency transmitter portion of the radio frequency transmitter/receiver 225. This multiplexer/demultiplexer 230 also takes the radio frequency signals received by the receiver portion of the radio frequency radio transmitter/receiver 225 and demultiplexes these signals to the audio frequency range for use by either the control unit 240, the TAD circuit 250, or the speakerphone 260. Ordinarily, switch 246 is in its normal "break" state for line 207, for preventing, for example, signals from the TAD circuit 250 or the speakerphone 260 from being coupled to the frequency multiplexer/demultiplexer 230 while signals are being received by the TAD circuit 250 or the speakerphone 260 from the line interface circuit 210.

If, while a user is interrogating from an adjunct unit the TAD circuitry 250 for messages, an incoming call is received, the line interface circuit 210 informs the control unit 240 and a signal interrupt is generated. This signal interrupt places on "hold" the query by the party at the adjunct unit informing him or her of such action and of the incoming telephone call. Once the call is completed, either directly by someone answering at a telephone station or according to predefined routing as set forth in the message center, the party is allowed to continue interrogating the TAD circuitry 250 for messages.

To ensure that the Caller ID information is promptly received by the adjunct units, the control unit 240 is coupled directly to the multiplexer/demultiplexer 230 for transmission of this Caller ID information to the appropriate one or more adjunct units. Therefore, when an incoming call is received, the Caller ID information is coupled via the line interface 210 into the control unit 240. If a match to the incoming Caller ID number is found in the memory portion of the control unit 240, then the control unit sends this information through the multiplexer/demultiplexer 230 with the proper code for transmission to the appropriate one or more adjunct units.

The control unit 240 has connected thereto a display 242 and keypad switches 244 which allow a user to interactively enter information such as how each incoming call having a recognized Caller ID number is processed in the telephone message system. The control unit 240 also provides an input to set-top box circuitry 255 which interacts with a television or other type of monitor display for providing the appropriate preprogrammed Caller ID information when a recognized incoming call is received over the tip-ring line 101. The control unit sends this information to the set-top box circuitry 255 for coupling this Caller ID information over the coaxial connector 106 to the television monitor 170 (FIG. 1). Circuitry suitable for use as set-top box circuitry 255 is readily available commercially from manufacturers of cable converters. Some manufacturers are: Panasonic, Stargate, Scientific Atlanta, Jerrold, Tocom, Oak and Zenith, for example. Thus, the set-top box circuitry 255 may be incorporated into the controller unit 200 and thus show at a first television monitor the name of a calling party or the called party in a captioned display as desired. Also, an adjunct unit, suitably modified, can be assigned to a second television monitor, and the Caller ID announcement generated in the adjunct unit can be broadcast at this second television monitor as well as other television monitors equipped with a suitably modified adjunct unit.

Figure 3:
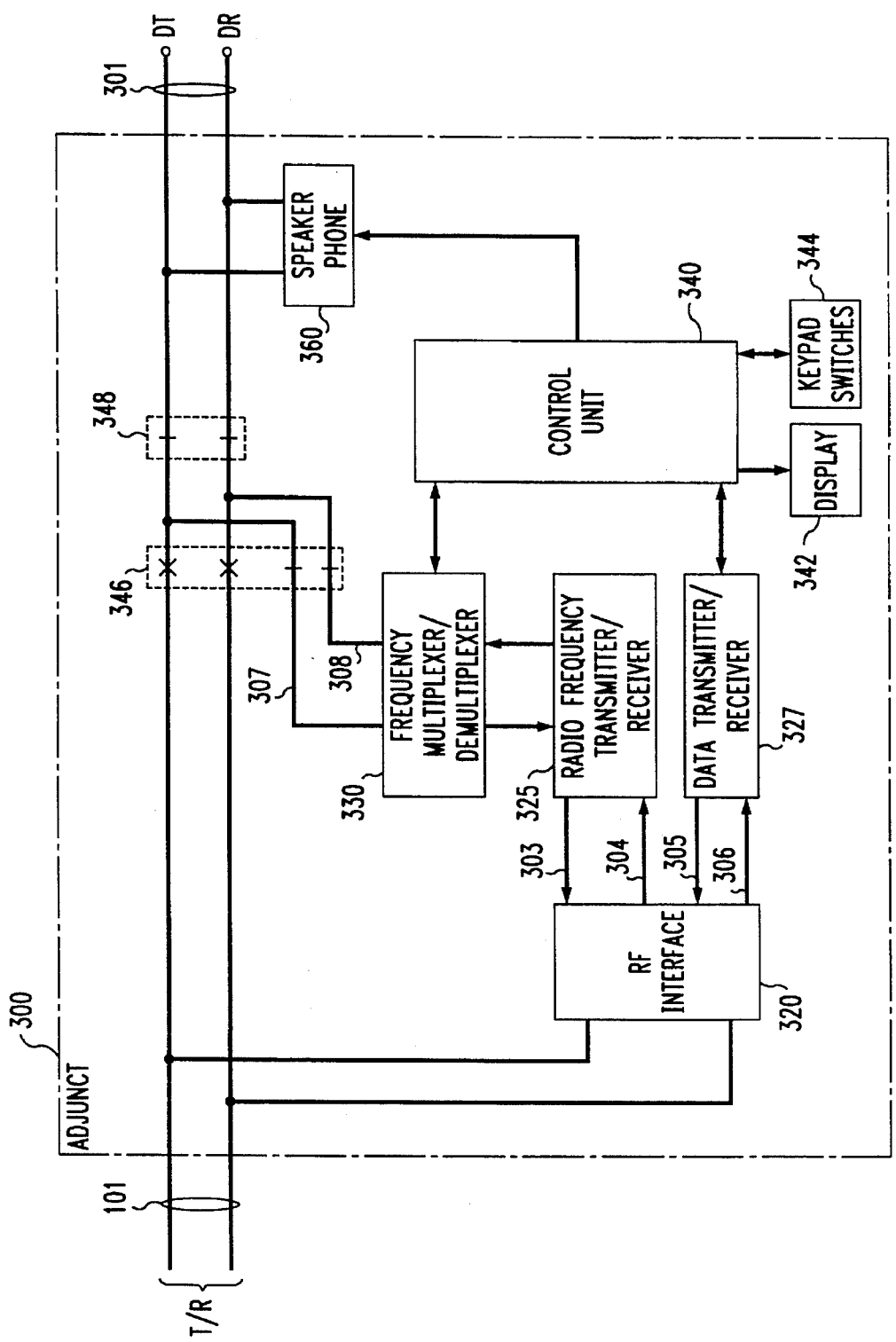
FIG. 3 is a block diagram of an adjunct unit for a telephone message system, according to the invention.

Referring next to FIG. 3, there is shown an enhanced block diagram of one of the plurality of adjunct units which plugs into any available wall telephone jack and shares the intrapremises telephone wire-pair with existing telephone stations without interference. Although the block diagram of only one adjunct unit 300 is shown, the circuitry in this adjunct unit is suitable for use and used in other adjunct units also operable in this system. Also, the basic components used in implementing the illustrated embodiment of the controller unit 200 shown in FIG. 2 are the same basic components used in implementing the illustrated embodiment of this adjunct unit 300. Because of this and the detailed description given the controller unit embodiment, this embodiment will be described in similar detail only where the operation of the component sections differ substantially and sufficient clarity of operation might not be readily apparent from the description provided in the controller unit embodiment.

Voiceband signals are received by the adjunct unit 300 over tip-ring line 101 and coupled through switches 346 and 348 and D-tip D-ring line 301 to a conventional telephone station. These same signals are coupled through switch 348 to a speakerphone 360. Actuation of the speakerphone is controlled by the control unit 340. Switches 346 and 348 also are controlled by the control unit 340 which receives controlling code information from the control unit 240 in the controller unit 200 or from a user of this adjunct who enters information, for example, on the keypad switches 344 which actuates the speakerphone or at a telephone device attached to the D-tip D-ring line 301.

Switch 346 is normally in its "make" state for lines 307 and 308 and in its normal "break" state for the tip-ring line 101. Switch 346 normally resides in its make state for the lines 307 and 308 to allow a user at either the speakerphone 360 or a telephone device attached to the D-tip D-ring line 301 to establish initial communications with the controller unit 200 by entering a code such as code: #9, for example, which will provide a user with the number of messages stored in his or her mailbox. Or the user could enter a code such as code #5 which is recognized by the control unit 340 as a request for dial tone, for example. In the first example the state of switch 346 does not change. In the second example, that portion of switch 346 on the tip-ring line 101 is switched to a make state and dial tone is provided to the D-tip D-ring line 301. Also in the second example, that portion of switch 346 for the lines 307 and 308 go to the break state to prevent signals appearing on the tip-ring line 101 and the D-tip D-ring line 301 from being coupled into the input of the frequency multiplexer/demultiplexer 330. Along with the keypad switches 344, a display 342 is also included for ease of entering data or requesting service at this adjunct unit by a user of the message system.

An RF interface 320 is included in adjunct unit 300 and is connected in parallel across the tip-ring line 101 for receiving the voice and control signals that are transmitted at RF frequencies from the controller unit 200 and coupled onto the tip-ring line 101. From the RF interface 320, signals are provided to both a radio frequency transmitter/receiver 325 and a data transmitter/receiver 327. Lines 303 and 304 connect the radio frequency transmitter/receiver 325 to the RF interface 320 and lines 305 and 306 connect the data transmitter/receiver 327 to the RF interface 320. Voiceband signals from either the standard telephone station attached to the D-tip D-ring line 301 or the speakerphone 360 are selectably provided either directly to the tip-ring line 101 or via the frequency multiplexer/demultiplexer 330, the radio frequency transmitter/receiver 325 and the RF interface 320 onto the tip-ring line 101. The direction in which this voiceband signal is coupled is determined by controlling information either entered by the user at the adjunct unit through the keypad switches or received from the controller unit 200 over the data channel. Data from the control unit 340 for the controller unit 200 is provided to the data transmitter/receiver 327 and then coupled onto the RF interface 320. Data for the control unit 340 from the controller unit 200 is received over the tip-ring line 101 and coupled through the interface 320 and the transmitter/receiver 327 to the control unit 340.

Although a specific structure for the adjunct units is shown, the structure of the adjunct units may vary from simple to complex. In its most simple structure, an adjunct unit is inserted between a telephone instrument and a wall jack and simply has a message waiting light for its display. A more complex adjunct unit may, as described herein, include a speakerphone and also have a message waiting light along with other displayable features. With a speakerphone as part of the adjunct unit, a user may answer a call directly and not have to pick up the handset on a telephone station attached to this more complex adjunct. If a voice server is also included in the telephone message system, then the speakerphone may also be used to place calls.

The controller unit can turn on each one of the speakerphones at each adjunct unit. Thus, if each adjunct unit is equipped with a speakerphone, distinctive ringing is facilitated. By way of example, if an incoming call from a known calling party with a predetermined number is identified via his or her Caller ID information, this calling party may be assigned to a specific called party among multiple parties in a residence. Thus, the calling party is assigned to the specific called party's mailbox. The controller unit then announces throughout the residence over the speakerphone at each adjunct unit the receipt of the telephone call from the calling party. This announcement may give the name of the calling party or, alternatively, the name of the called party.

Figure 4:
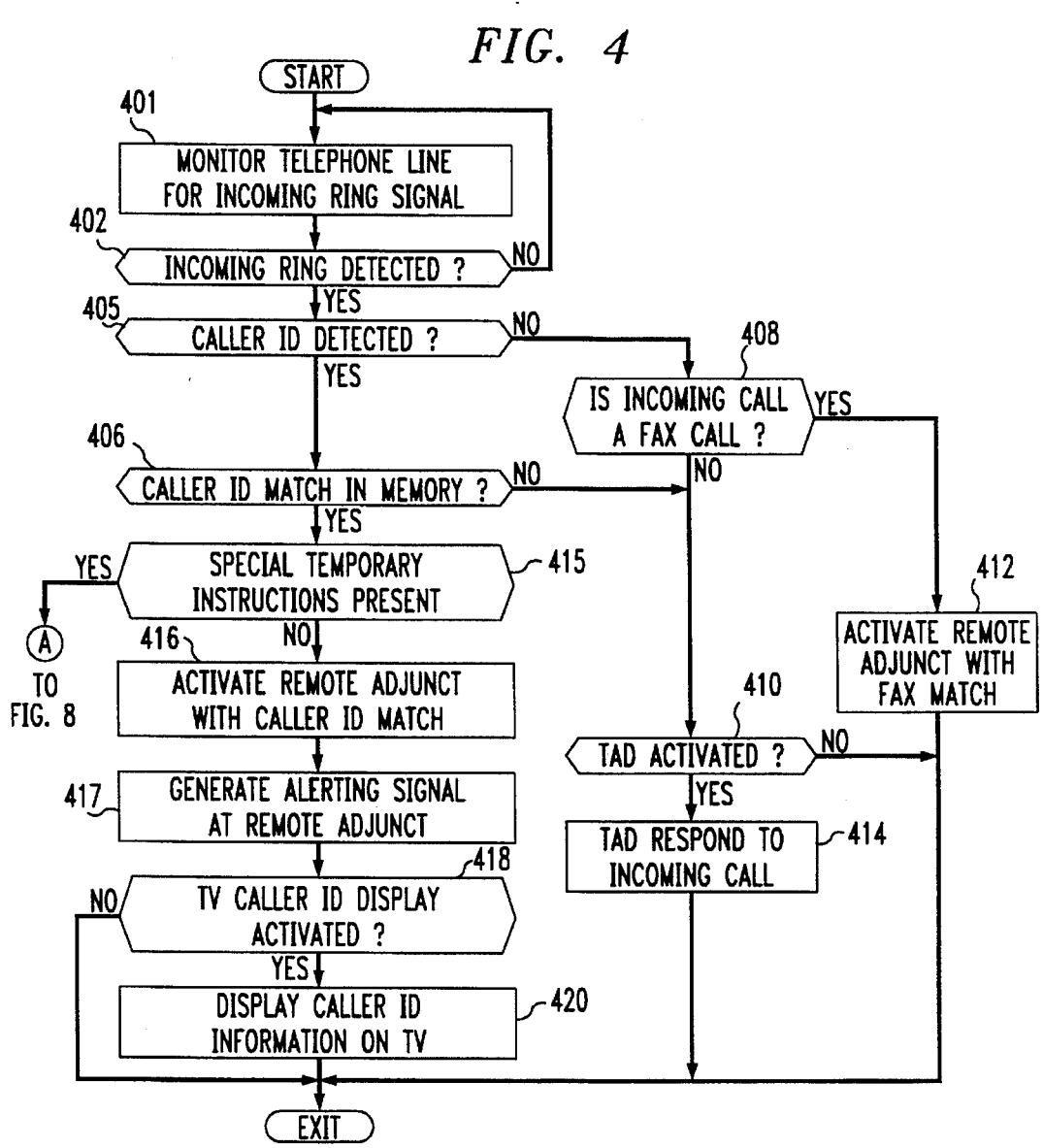
FIG. 4 shows in detail certain aspects of a protocol of the telephone message system, the protocol depicting the specific process within both the controller unit and one or more adjunct units in responding to a ring signal detected on the telephone line, according to the invention.

Referring now to FIG. 4, there is shown in flow chart form the operation of the telephone message system with the desired functionality including criterion for the controller unit 200 and multiple adjunct units 300 through 320 in responding to a ring signal detected on the telephone tip-ring line 101. The functions provided by control units 240 and 340 are advantageously determined by a process or program stored in ROM (not shown).

The process is entered at step 401 where the controller unit 200, which is connected to the tip-ring line 101, monitors this line for an incoming ring signal. From step 401, the process advances to step 402 where it is determined if an incoming ring signal has been detected. If an incoming ring signal has not been detected, the process returns to step 401 and cycles between this step 401 and this decision 402. If, however, an incoming ring signal is detected at step 402, the process advances to step 405 where it is determined whether the incoming call is accompanied by a caller ID signal. If so, the process advances to step 406 where a search is made in memory of the control unit 240 to determine if the incoming caller ID number matches a number previously stored in this memory.

If a caller ID number is not detected as indicated in step 405, the process advances to step 408 where it is determined whether the incoming call is a facsimile call. If the incoming call is not a facsimile call as indicated in step 408, or a caller ID match is not found in memory as provided for in decision 406, the process advances to decision 410 where it is determined whether the telephone answering device which comprises circuitry 250 is activated. If the TAD device is activated, the process advances to step 414 where the TAD responds to the incoming call. If the incoming call is a facsimile call as indicated in decision 408, the process advances to step 412 where a remote adjunct unit which is associated with a facsimile machine is activated for routing the call to the facsimile machine. From steps 412 and 414, the process is exited.

Figure 8:
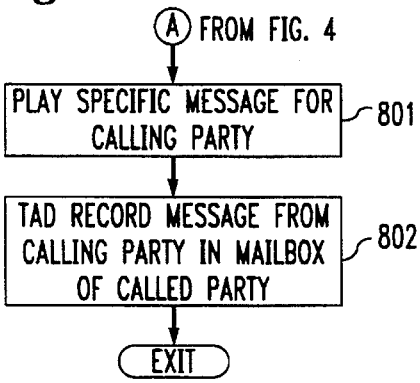
FIG. 8 shows certain further aspects of the protocol of the telephone message system shown in FIG. 4.

Referring once again to decision 406, if a caller ID match is found in memory, the process advances to decision 415 where a determination is made as to whether the called party for which the caller ID match is made has provided temporary instructions as to how this call from this calling party is to be treated. If temporary instructions are present in this decision, the process advances to step 801, shown in FIG. 8, where the special temporary instructions, such as play a specific message for the calling party, are executed. The specific message could be a general message played for all of the callers who are assigned to the called party's mailbox when the called party is unavailable. The specific message also could be one that is played only to a particular caller identified by his or her Caller ID. From step 801, the process advances to step 802 where the TAD records any message from the calling party in the mailbox of the called party. From step 802, the process is exited.

With reference once again to decision 415, if temporary instructions are not present in this decision, the process advances to step 416 where the remote adjunct unit, or adjunct units, which is associated with the specific caller ID match is activated. From step 416, the process advances to step 417 where an alerting signal is generated at the one or more remote adjunct units. Depending upon the preferences of the user, the alerting signal at the remote can take one of two forms. It is known that the caller ID number generally identifies not only a person who is calling but possibly also a person to whom the call is directed. It is therefore a high probably that only certain people at a location will receive calls from certain other people. Thus, if a voice synthesizer is available in the message system, the remote adjunct unit may be configured with a high degree of accuracy to say "More is calling" or "call for Susan."

By way of further example, if calls from a specific number are always for a specific party who normally has a telephone station located in a specific location, i.e., a bedroom, these calls may be directed by the controller unit to the remote adjunct unit that connects that specific telephone station to the tip-ring line. Thus, if calls from a specific number are always for a son or a daughter in the home, for example, the controller unit, having recognized the caller ID associated with this number, will ring only that son or daughter's telephone in his or her room. The advantage of such an arrangement clearly is that if the son or daughter is not at home and temporary instructions, such as may be provided in decision 415, are not provided, then other members of the family can, as an option, not answer the phone and let the answering machine take a message.

From step 417, the process advances to decision 418 where a determination is made as to whether the television (or other monitor type device) caller ID display is activated. If not, the process is exited. If the television caller ID display is activated, however, the process advances to step 420 where the caller ID information is displayed on the television. One manner of displaying this information is by having incoming call information automatically scroll across the bottom of the television screen similar to the information now provided on television sets while operating in a captioned format. From display 420, the process is exited.

Figure 5:
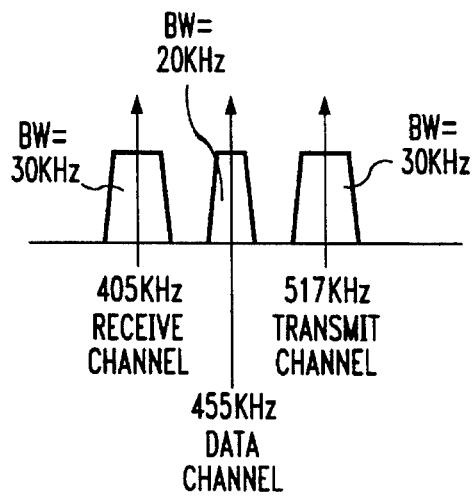
FIG. 5 illustrates the frequency allocation of the radio frequency channels used in the present invention.

Transmission between the controller unit 200 and an adjunct unit or between two adjunct units takes place at radio frequencies according to the frequency spectrum allocation set forth in FIG. 5. Data communication takes place in a data channel which is centered at 455 KHz. All units (controller and adjuncts) transmit and receive at this frequency using amplitude modulation. Voice communications takes place in a voice receive channel and a voice transmit channel. The controller unit 200 and the adjunct units 300 through 320 transmit and receive at the frequencies indicated in FIG. 5 using frequency modulation.

Specifically, the transmitter portion of radio frequency transmitter/receiver 225 of FIG. 2 and also the transmitter portion of radio frequency transmitter/receiver 325 of FIG. 3 operate with a center frequency of 517 KHz, as shown in FIG. 5. And the receiver portion of radio frequency transmitter/receiver 225 and also the receiver portion of radio frequency transmitter/receiver 325 operate with a center frequency of 405 KHz, as also shown in FIG. 5. The transmitters in both transmitter/receiver 225 and 325 are frequency modulated (FM) transmitters. Since these transmitters are connected to the telephone line, via an associated RF interface 220 or 320, the maximum allowable power is set by Part 68 of the FCC Rules. Under these rules, energy in the frequency band 270 KHz-6 MHz must be less than −15 dBv when averaged over a 2 microsecond interval. The design of such FM transmitters and receivers is well known and may be readily constructed using conventional circuit design techniques.

In the disclosed embodiment of FIG. 2 the controller 200 includes a single radio frequency transmitter/receiver 225 and a single frequency multiplexer/demultiplexer 230 which is associated with the transmitter/receiver 225. These units permit communications between the speakerphone 260 or the TAD circuit 250 and the adjunct units over the radio frequency channel, also provided on the tip-ring line 101. Although, in the disclosed embodiment, the intercom feature between the controller unit 200 and an adjunct unit or between two adjunct units is provided in a half-duplex mode, this embodiment is readily modifiable to provide this feature in a full-duplex mode. Such modification entails simply including two pairs of radio frequency transmitters and receivers and their associated frequency multiplexer/demultiplexers in the controller unit 200 for communicating with the adjunct units and bridging these adjunct units in a conference connection with the control unit 200. In such modified embodiment, each one of the pair of radio frequency transmitters and receivers in the control unit 200 operates on fixed preassigned channels. The adjunct units, on the other hand, may continue to have only one radio frequency transmitter and receiver whose operating frequencies are selected depending upon whether the intercom call is being originated or answered at the adjunct unit.

The data channel, which is centered at 455 KHz as shown in FIG. 5, is designed to be an inexpensive technique for reliable communications in a potentially noisy environment. The communications protocol is implemented in firmware using the control unit 240 of the controller 200 and the control units in each adjunct unit, the control unit 340 being illustratively shown in adjunct unit 300. The control units have integrated hardware for a dual-edge detection vectored interrupt and an event timer with vectored interrupt on overflow. The data channel uses a half-duplex broadcasting scheme with each unit having access to the same channel. To facilitate orderly access to the data channel, all units look for incoming data before transmitting. The channel must be idle for 16 ms before attempting to transmit a new message.

The data transmitter in data transmitter/receiver 227 and also data transmitter/receiver 327 is responsive to a binary digital signal for turning a 455 KHz carrier off and on. First, however, the binary digital signal is encoded into a series of pulses having alternating polarity in which a "1" has a duration of 1 ms and a "0" has a duration of 2 ms. Accordingly, if "0" and "1" are equally likely, the nominal signaling rate for the data channel is 667 bits per second. This signaling scheme is known as the Pulse Width Encoded—Non Return-to-Zero (PWE-NRz) format. The data receivers in data transmitter/receiver 227 and also data transmitter/receiver 327 convert the presence and absence of 455 KHz carrier into discrete levels and thereafter perform appropriate decoding to recover the binary digital signal.

Figure 6A:
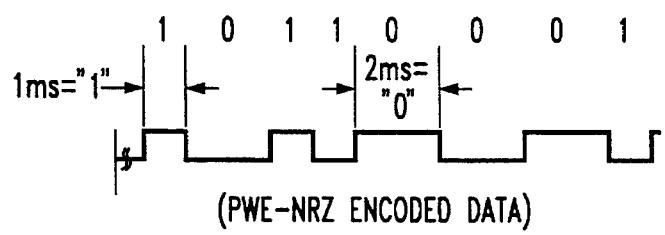
FIGS. 6A and B illustrate various waveforms associated with data transmission using a pulse width encoded—non return-to-zero format and on/off carrier keying.
Figure 6B:

FIG. 6A discloses an exemplary binary digital signal (10110001) that is pulse width encoded and thereafter used to amplitude modulate the 455 KHz carrier, as shown in FIG. 6B. Although on/off carrier keying and half-duplex transmission are used in the disclosed embodiment of the data channel, it is clear that other forms of modulation and transmission may be used within the scope of the invention.

Figure 7:
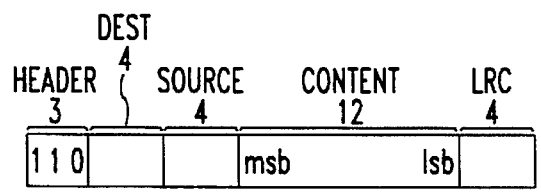
FIG. 7 discloses a message packet suitable for use over the data channel employed in the telephone message system.

FIG. 7 discloses the telephone message system message packet which is defined to be 27 bits long and broken down into the following fields.

Header: 3 bits, '110' to access the channel and announce the forthcoming message.

Destination: 4 bits, used to identify which receiving unit should consider processing the message. A message can only be processed if the destination address matches that of the unit address or if the destination address is '0000', the global addressing value.

Source: 4 bits, identifying the transmitting unit. Units without a programmed address should use '0000'.

Content: 12 bits, containing the informational part of the message. The content may be considered as 3 separate 4 bit fields.

LRC: 4 bits, resulting from a Longitudinal Redundancy Check calculated over the destination, source, and contents.

All fields are transmitted most significant bit (msb) first (see FIG. 7). A message packet can range from 32 ms to 48 ms in duration. Incoming messages are examined to see if there have been any transitions on the data channel for 4 ms. If the correct number of bits has been received and the actual LRC matches the calculated LRC, the next 4 ms interval will be dedicated to looking for a negative acknowledgment (NAK) from any other unit. In the absence of a NAK, the message is accepted for destination screening and further processing. If a NAK is detected, the message is discarded. A NAK consists of turning carrier ON for a 2-ms interval starting 4 ms after the completion of the message. The absence of carrier for 16 ms is deemed to be the idle state. After 16 ms of idle time, any unit may start transmitting—so long as another has not. When collision occurs, each of the units will complete its message to enforce the collision. The result, then, is that the message will surely be garbled and retransmission will be required. A transmission unit that has its message NAKed is allowed to retransmit the message after the channel has been idle for 6 ms to 9 ms. The actual time interval is determined by calculating a "pseudo-random" number from 0 to 3 and adding it to the base delay of 6 ms. The need for a random retransmission time arises from message collision considerations when two units transmit at the same time, both calculating idle time from the same event.

What has been described is merely illustrative of the present invention. Other applications to telephone, computer or other telephone messaging systems other than the disclosed system are contemplated as being within the knowledge of one skilled in the art and may be utilized without departing from the spirit and scope of the present invention.

We claim:

1. A telephone message system for use at a subscriber's premises, adapted to be parallel connected onto a wire-pair that extends between said premises and a telephone line switching system, the message system comprising:

controller means connected onto said wire-pair for receiving the identity of one of a plurality of preselected calling stations over said wire-pair in a first frequency band;

mailbox means having a plurality of mailboxes for storing telephone messages, each mailbox being respectively associated with a group of preselected calling stations;

call receiving means responsive to receipt of the identity of one of said preselected calling stations for routing a call from said calling station to the respectively associated mailbox within the plurality of mailboxes; and at least one adjunct unit operatively, responsive to the controller means, the adjunct unit being commonly connected onto said wire-pair and communicating with said controller means over said wire-pair in a second frequency band for interrogating at least a specific one of said plurality of mailboxes for determining when a telephone message from at least one of said preselected calling stations is stored in said specific one of said plurality of mailboxes, said second frequency band being different from said first frequency band.

2. The message system of claim 1 further including a plurality of adjunct units operatively responsive to the controller means, each one of the plurality of adjunct units being commonly connected onto said wire-pair and communicating with said controller means over said wire-pair in said second frequency band.

3. The message system of claim 1 wherein said adjunct unit includes means for retrieving a telephone message stored in said specific one of said plurality of mailboxes.

4. The message system of claim 3 wherein said retrieving said retrieving means includes code means enterable at said adjunct unit for retrieving the telephone message stored in said specific one of said plurality of mailboxes.

5. The message system of claim 1 wherein said controller means further includes outgoing message means responsive to receipt of the identity of one of said preselected calling stations for sending a message to said calling station, each outgoing message being indicative of a called party associated with a mailbox within the plurality of mailboxes.

6. The message system of claim 4 wherein said first frequency band is in the audible frequency range.

7. The message system of claim 6 wherein said first frequency band is below 4 KHz.

8. The message system of claim 6 wherein said second frequency band is located entirely above the audible frequency range.

9. The message system of claim 7 wherein said second frequency band is above 4 KHz.

10. The message system of claim 4 wherein said mailbox means comprises a digital answering machine.

11. A method for processing telephone calls in a message system arranged for use at a subscriber's premises, the message system being adapted to be parallel connected onto a wire-pair that extends between said premises and a telephone line switching system, the method comprising the steps of:

receiving in a controller the identity of one of a plurality of preselected calling stations over said wire-pair in a first frequency band;

storing telephone messages in a plurality of mailboxes, each mailbox being respectively associated with a group of preselected calling stations;

routing a call from said calling station to the respectively associated mailbox within the plurality of mailboxes in response to receipt of the identity of said calling station;

connecting at least one adjunct unit onto the wire-pair, the adjunct unit being operatively responsive to the controller and communicating with said controller over said wire-pair in a second frequency band, said second frequency band being different from said first frequency band; and interrogating in said adjunct unit at least a specific one of said plurality of mailboxes for determining when a telephone message from at least one of said preselected calling stations is stored in said specific one of said plurality of mailboxes.

12. The method of claim 11 further including the step of commonly connecting a plurality of adjunct units onto the wire-pair, each one of the plurality of adjunct units being operatively responsive to the controller, and communicating with said controller over said wire-pair in said second frequency band.

13. The method of claim 11 further including the step of retrieving in said adjunct unit a telephone message stored in said specific one of said plurality of mailboxes.

14. The method of claim 13 wherein the retrieving step includes the step of entering a preselected code at said adjunct unit for retrieving the telephone message stored in said specific one of said plurality of mailboxes.

15. The method of claim 11 further including sending an outgoing message to one of said preselected calling stations responsive to receipt of the identity of said calling station, each outgoing message being indicative of a called party associated with a mailbox within the plurality of mailboxes.

16. The method of claim 14 wherein said first frequency band is the audio frequency band.

17. The method of claim 16 wherein said first frequency band is below 4 KHz.

18. The method of claim 17 wherein said second frequency band is located entirely above the audio frequency band.

19. The method of claim 17 wherein said second frequency band is above 4 KHz.

20. The method of claim 14 wherein said plurality of mailboxes comprises a digital answering machine.

21. A telephone message apparatus for use at a subscriber's premises, adapted to be parallel connected onto a wire-pair that extends between said premises and a telephone line switching system, the message apparatus comprising:

controller means connected onto said wire-pair for receiving the identity of one of a plurality of preselected calling stations over said wire-pair in a first frequency band;

mailbox means having a plurality of mailboxes for storing telephone messages, each mailbox being respectively associated with a group of preselected calling stations;

call receiving means responsive to receipt of the identity of one of said preselected calling stations for routing a call from said calling station to the respectively associated mailbox within the plurality of mailboxes; and a plurality of adjunct units operatively responsive to the controller means, each one of the plurality of adjunct units being commonly connected onto said wire-pair and communicating with said controller means over said wire-pair in a second frequency band for retrieving a telephone message stored in at least a specific one of said plurality of mailboxes, said second frequency band being different from said first frequency band.

22. The telephone message apparatus of claim 21 wherein each one of the plurality of adjunct units includes means for interrogating at least one of the plurality of mailboxes for determining when a telephone message from at least one of said preselected calling stations is stored in said at least one of the plurality of mailboxes.

23. The telephone message apparatus of claim 21 wherein each of said adjunct units includes means for entering a code for retrieving the telephone message stored in said at least one of said plurality of mailboxes.

24. The telephone message apparatus of claim 23 wherein said controller means further includes outgoing message means responsive to receipt of the identity of one of said preselected calling stations for sending a message to said calling station, each outgoing message being indicative of a called party associated with a mailbox within the plurality of mailboxes.

25. A telephone message apparatus adapted to be parallel connected onto a wire-pair that extends between a subscriber's premises and a telephone line switching system, the message apparatus comprising:

controller means connected onto said wire-pair for receiving the identity of one of a plurality of preselected calling stations over said wire-pair in a first frequency band;

mailbox means having a plurality of mailboxes for storing telephone messages, each mailbox being respectively associated with a group of preselected calling stations;

call receiving means responsive to receipt of the identity of one of said preselected calling stations for routing a call from said calling station to the respectively associated mailbox within the plurality of mailboxes; and at least one adjunct unit operatively responsive to the controller means, the adjunct unit being commonly connected onto said wire-pair and communicating with said controller means over said wire-pair in a second frequency band for retrieving a telephone message stored in at least a specific one of said plurality of mailboxes, said second frequency band being different from said first frequency band.

26. The telephone message apparatus of claim 25 further including a plurality of adjunct units operatively responsive to the controller means, each one of the plurality of adjunct units being commonly connected onto said wire-pair and communicating with said controller means over said wire-pair in said second frequency band.

27. The telephone message apparatus of claim 26 wherein each one of the plurality of adjunct units includes means for interrogating at least one of the plurality of mailboxes for determining when a telephone message from at least one of said preselected calling stations is stored in said at least one of the plurality of mailboxes.

28. The telephone message apparatus of claim 27 wherein said controller means further includes outgoing message means responsive to receipt of the identity of one of said preselected calling stations for sending a message to said calling station, each outgoing message being indicative of a called party associated with a mailbox within the plurality of mailboxes.

* * * * *